United States Patent
Lee et al.

(10) Patent No.: US 9,947,913 B2
(45) Date of Patent: Apr. 17, 2018

(54) METHOD FOR WELDING METAL TAB OF ELECTRODE LAYER FOR CABLE BATTERY AND ELECTRODE MANUFACTURED THEREBY

(71) Applicant: LG CHEM, LTD., Seoul (KR)

(72) Inventors: Jinsoo Lee, Daejeon (KR); Taesu Kim, Daejeon (KR); Hyeran Jung, Daejeon (KR); Bugon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 25 days.

(21) Appl. No.: 14/913,887

(22) PCT Filed: Oct. 17, 2014

(86) PCT No.: PCT/KR2014/009808
§ 371 (c)(1),
(2) Date: Feb. 23, 2016

(87) PCT Pub. No.: WO2015/057024
PCT Pub. Date: Apr. 23, 2015

(65) Prior Publication Data
US 2016/0211500 A1    Jul. 21, 2016

(30) Foreign Application Priority Data

Oct. 18, 2013  (KR) .................. 10-2013-0124299
Oct. 17, 2014  (KR) .................. 10-2014-0141072

(51) Int. Cl.
*H01M 2/26*   (2006.01)
*B23K 26/22*  (2006.01)
(Continued)

(52) U.S. Cl.
CPC .......... *H01M 2/26* (2013.01); *B23K 26/0081* (2013.01); *B23K 26/0622* (2015.10);
(Continued)

(58) Field of Classification Search
None
See application file for complete search history.

(56) References Cited

U.S. PATENT DOCUMENTS 6,447,950 B1     9/2002   Iijima
2006/0263686 A1* 11/2006  Zhao ................. B23K 26/22
                                                    429/211
(Continued)

FOREIGN PATENT DOCUMENTS

CN   102339899 A    2/2012
EP   2610956 A2     7/2013
(Continued)

*Primary Examiner* — Alix Eggerding
(74) *Attorney, Agent, or Firm* — Dentons US LLP

(57) ABSTRACT

Disclosed are a method of welding a metal tab of an electrode layer for a cable battery and an electrode manufactured thereby. This welding method, suitable for welding a metal tab to an electrode including a current collector for a cable battery, a conductive layer formed on the outer surface of the current collector, and a polymer film layer formed on the inner surface of the current collector, includes: a) removing a portion of the conductive layer using a pulse laser, thus exposing the surface of the current collector positioned thereunder, and b) welding a metal tab to the surface of the current collector, thus enabling the welding of a metal tab and an electrode for a cable battery, which has been difficult to achieve using a conventional welding process.

11 Claims, 3 Drawing Sheets

(51) Int. Cl.
  *B23K 26/0622* (2014.01)
  *B23K 26/323* (2014.01)
  *H01M 10/04* (2006.01)
  *H01M 4/75* (2006.01)
  *B23K 26/20* (2014.01)
  *B23K 26/40* (2014.01)
  *H01M 4/70* (2006.01)
  *B23K 26/00* (2014.01)
  *B23K 26/354* (2014.01)
  *B23K 26/60* (2014.01)
  *H01M 2/22* (2006.01)
  *H01M 4/66* (2006.01)
  *H01M 4/74* (2006.01)
  *B23K 101/38* (2006.01)
  *B23K 103/16* (2006.01)
  *B23K 103/08* (2006.01)
  *B23K 103/00* (2006.01)

(52) U.S. Cl.
  CPC .............. *B23K 26/20* (2013.01); *B23K 26/22* (2013.01); *B23K 26/323* (2015.10); *B23K 26/354* (2015.10); *B23K 26/40* (2013.01); *B23K 26/60* (2015.10); *H01M 2/22* (2013.01); *H01M 4/661* (2013.01); *H01M 4/667* (2013.01); *H01M 4/70* (2013.01); *H01M 4/75* (2013.01); *H01M 10/0422* (2013.01); *H01M 10/0436* (2013.01); *B23K 2201/38* (2013.01); *B23K 2203/08* (2013.01); *B23K 2203/172* (2015.10); *B23K 2203/50* (2015.10); *H01M 4/74* (2013.01); *H01M 2220/30* (2013.01)

(56) References Cited

U.S. PATENT DOCUMENTS

| | | | | |
|---|---|---|---|---|
| 2007/0266554 | A1* | 11/2007 | Bruce | H01M 4/0404 29/623.3 |
| 2009/0081512 | A1* | 3/2009 | Blanchard | H01M 8/122 429/425 |
| 2011/0217588 | A1* | 9/2011 | Roh | H01M 4/62 429/163 |
| 2011/0274954 | A1 | 11/2011 | Cho et al. | |
| 2012/0107658 | A1 | 5/2012 | Kwon et al. | |
| 2012/0135285 | A1* | 5/2012 | Iwama | H01M 2/26 429/94 |
| 2014/0170452 | A1* | 6/2014 | Abe | H01M 4/661 429/94 |
| 2015/0318555 | A1* | 11/2015 | Oku | B32B 15/085 429/245 |

FOREIGN PATENT DOCUMENTS

| | | |
|---|---|---|
| JP | 03-110078 A | 5/1991 |
| KR | 10-2001-0034617 A | 4/2001 |
| KR | 10-2012-0051163 A | 5/2012 |
| KR | 10-2013-0040552 A | 4/2013 |
| KR | 10-2013-0048706 A | 5/2013 |
| WO | 2009/111744 A2 | 9/2009 |

* cited by examiner

METHOD FOR WELDING METAL TAB OF ELECTRODE LAYER FOR CABLE BATTERY AND ELECTRODE MANUFACTURED THEREBY

This application is a National Stage Entry of International Application No. PCT/KR2014/009808, filed on Oct. 17, 2014, and claims the benefit of and priority to Korean Application No. 10-2013-0124299, filed on Oct. 18, 2013, and Korean Application No. 10-2014-0141072, filed on Oct. 17, 2014, all of which are incorporated herein by reference in their entirety for all purposes as if fully set forth herein.

TECHNICAL FIELD

The present invention relates to a method of welding a metal tab of an electrode layer for a cable battery and an electrode manufactured thereby.

BACKGROUND ART

Rechargeable secondary batteries are widely utilized in portable devices, tools, uninterruptible power supplies, etc. In particular, wireless communication techniques are receiving attention as power sources for portable devices and the like.

With the recent advancement of mobile devices, cable-type secondary batteries, the shape of which may be freely changed, are required these days. The process of manufacturing a cable-type secondary battery includes welding a metal tap to an electrode layer for a cable-type secondary battery. However, the cable-type secondary battery is problematic because an insulating layer and a conductive layer formed on the electrode layer are made of a polymer material, and thus, weld quality resulting from typical welding of the electrode layer may become poor.

With the goal of solving such problems, for example, Korean Patent Application Publication No. 10-2013-0040552 discloses that slippage between an electrode part and a terminal part is minimized, thus facilitating weld bonding and increasing welding performance. However, even when this technique is applied to the welding of the metal tab and the electrode layer for a cable-type secondary battery, the improvement of the weld quality is limited.

DISCLOSURE

Technical Problem

The present invention has been made keeping in mind the above problems encountered in the related art, and an object of the present invention is to provide a welding method, which enables the welding of a metal tab and an electrode for a cable-type secondary battery, which was conventionally impossible, using a pulse laser.

Technical Solution

In order to accomplish the above object, the present invention provides a method of welding a metal tab of an electrode layer for a cable battery, suitable for welding a metal tab to an electrode comprising a current collector for a cable battery, a conductive layer formed on the outer surface of the current collector, and a polymer film layer formed on the inner surface of the current collector, the method comprising: a) removing a portion of the conductive layer using a pulse laser, thus exposing the surface of the current collector positioned thereunder; and b) welding a metal tab to the surface of the current collector.

In addition, the present invention provides an electrode for a cable battery, comprising a current collector for a cable battery, a conductive layer formed on the outer surface of the current collector, and a polymer film layer formed on the inner surface of the current collector, wherein a metal tab is welded on the surface of the current collector, from which a portion of the conductive layer is removed.

In addition, the present invention provides a cable-type secondary battery having a horizontal cross-section with a predetermined shape and extending in a longitudinal direction, comprising: a wire-type internal current collector having a first metal tab extending to a predetermined length at one end thereof; an inner electrode active material layer formed on the surface of the internal current collector; a separation layer formed on the outer surface of the inner electrode active material layer; and an outer electrode formed on the outer surface of the separation layer and including an outer electrode active material layer and a current collector having a second metal tab extending to a predetermined length at one end thereof, wherein the outer electrode is the electrode for a cable battery as described above.

Advantageous Effects

According to the present invention, a method of welding a metal tab of an electrode layer for a cable battery enables the welding of a metal tab and an electrode for a cable battery, which has been impossible to realize using conventional ultrasonic welding.

BEST MODE

Figure 1:
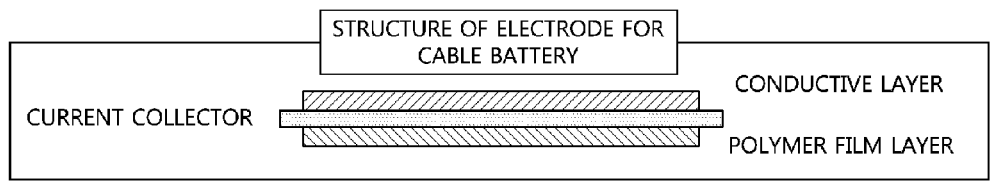
FIG. 1 illustrates the structure of a cable electrode according to the present invention.

Hereinafter, the present invention is described in detail.

The present invention addresses a method of welding a metal tab of an electrode layer for a cable battery, suitable for welding a metal tab to an electrode comprising a current collector for a cable battery, a conductive layer formed on the outer surface of the current collector, and a polymer film layer formed on the inner surface of the current collector, the method comprising: a) removing a portion of the conductive layer using a pulse laser, thus exposing the surface of the current collector positioned thereunder; and b) welding a metal tab to the surface of the current collector.

In the welding method according to the present invention, the current collector for a cable battery is a cathode for a cable battery or an anode for a cable battery.

In the welding method according to the present invention, the current collector for a cable battery is a pipe-type current collector, a wound wire-type current collector, a wound sheet-type current collector, or a mesh current collector.

In the welding method according to the present invention, the current collector for a cable battery is formed of stainless steel, aluminum, nickel, titanium, fired carbon, copper;

stainless steel surface-treated with carbon, nickel, titanium or silver; an aluminum-cadmium alloy; a non-conductive polymer surface-treated with a conductive material; or a conductive polymer.

In the welding method according to the present invention, the conductive layer comprises any one or more selected from the group consisting of polyacetylene, polyaniline, polypyrrole, polythiophene, polysulfur nitride, indium tin oxide (ITO), silver, palladium, and nickel.

In the welding method according to the present invention, the polymer film layer comprises any one or more selected from the group consisting of a polyimide resin, a polyethylene terephthalate (PET) resin, and a polyethylene (PE) resin.

In the welding method according to the present invention, the metal tab is formed of any one or more selected from the group consisting of stainless steel, aluminum, nickel, titanium, fired carbon, copper; stainless steel surface-treated with carbon, nickel, titanium or silver; and an aluminum-cadmium alloy.

In a) of the welding method according to the present invention, as the pulse laser, a 50 W pulse laser with an IR wavelength is applied at an average power density ranging from 1 M to 2 MW/cm$^2$.

In a) of the welding method according to the present invention, as the pulse laser, a 50 W pulse laser with an IR wavelength is applied at an average power density ranging from 1.3 M to 1.7 MW/cm$^2$.

In b) of the welding method according to the present invention, the welding is performed by applying a pulse laser or ultrasonic waves.

In the welding method according to the present invention, as the pulse laser, a 500 W pulse laser with an IR wavelength is applied at an average power density of 3 MW/cm$^2$ or more.

In the welding method according to the present invention, as the pulse laser, a 500 W pulse laser with an IR wavelength is applied at an average power density ranging from 3 M to 4 MW/cm$^2$.

In addition, the present invention addresses an electrode for a cable battery, comprising a current collector for a cable battery, a conductive layer formed on the outer surface of the current collector, and a polymer film layer formed on the inner surface of the current collector, wherein a metal tab is welded on the surface of the current collector, from which a portion of the conductive layer is removed.

In the electrode for a cable battery according to the present invention, the current collector for a cable battery is a cathode for a cable battery or an anode for a cable battery.

In the electrode for a cable battery according to the present invention, the current collector for a cable battery is a pipe-type current collector, a wound wire-type current collector, a wound sheet-type current collector, or a mesh current collector.

In the electrode for a cable battery according to the present invention, the current collector for a cable battery is formed of stainless steel, aluminum, nickel, titanium, fired carbon, copper; stainless steel surface-treated with carbon, nickel, titanium or silver; an aluminum-cadmium alloy; a non-conductive polymer surface-treated with a conductive material; or a conductive polymer.

In the electrode for a cable battery according to the present invention, the conductive layer comprises any one or more selected from the group consisting of polyacetylene, polyaniline, polypyrrole, polythiophene, polysulfur nitride, ITO, silver, palladium, and nickel.

In the electrode for a cable battery according to the present invention, the polymer film layer comprises any one or more selected from the group consisting of a polyimide resin, a PET resin, and a PE resin.

In the electrode for a cable battery according to the present invention, the metal tab is formed of any one or more selected from the group consisting of stainless steel, aluminum, nickel, titanium, fired carbon, copper; stainless steel surface-treated with carbon, nickel, titanium or silver; and an aluminum-cadmium alloy.

The electrode for a cable battery according to the present invention is manufactured by the above method.

In addition, the present invention addresses a cable-type secondary battery having a horizontal cross-section with a predetermined shape and extending in a longitudinal direction, comprising: a wire-type internal current collector having a first metal tab extending to a predetermined length at one end thereof; an inner electrode active material layer formed on the surface of the internal current collector; a separation layer formed on the outer surface of the inner electrode active material layer; and an outer electrode formed on the outer surface of the separation layer and including an outer electrode active material layer and a current collector having a second metal tab extending to a predetermined length at one end thereof, wherein the outer electrode is the electrode for a cable battery as described above.

MODE FOR INVENTION

Below is a more detailed description of the present invention.

According to the present invention, a method of welding a metal tab of an electrode layer for a cable battery, suitable for welding a metal tab to an electrode comprising a current collector for a cable battery, a conductive layer formed on the outer surface of the current collector, and a polymer film layer formed on the inner surface of the current collector, the method comprising: a) removing a portion of the conductive layer using a pulse laser, thus exposing the surface of the current collector positioned thereunder; and b) welding a metal tab to the surface of the current collector.

The welding method according to the present invention may be applied to the welding of a metal tab and an electrode when the electrode for a cable battery is coated with a polymer material.

The electrode for a cable battery according to the present invention is configured to include a current collector for a cable battery, a conductive layer formed on the outer surface of the current collector, an active material layer formed on the conductive layer, and a polymer film layer on the inner surface of the current collector. When the active material layer is removed using an alcohol such as IPA, the electrode may include, as illustrated in FIG. 1, a current collector for a cable battery, a conductive layer formed on the outer surface of the current collector, and a polymer film layer on the inner surface of the current collector.

The current collector for a cable battery may be an external current collector or an internal current collector, depending on the requirements.

The current collector for a cable battery may be a cathode for a cable battery or an anode for a cable battery, depending on the requirements.

The current collector for a cable battery may be a pipe-type current collector, a wound wire-type current collector, a wound sheet-type current collector, or a mesh current collector.

The current collector for a cable battery is not particularly limited, but may be formed of stainless steel, aluminum, nickel, titanium, fired carbon, copper; stainless steel surface-treated with carbon, nickel, titanium or silver; an aluminum-cadmium alloy; a non-conductive polymer surface-treated with a conductive material; or a conductive polymer, taking into consideration the price and the electrochemical stability of a metal for a current collector within the range of operation of batteries.

The conductive layer is not particularly limited so long as it exhibits conductivity without causing chemical changes to the battery, and preferably includes any one or more selected from the group consisting of polyacetylene, polyaniline, polypyrrole, polythiophene, polysulfur nitride, ITO, silver, palladium, and nickel.

The polymer film layer is not particularly limited, but preferably includes any one or more selected from the group consisting of a polyimide resin, a PET resin, and a PE resin.

Figure 2:
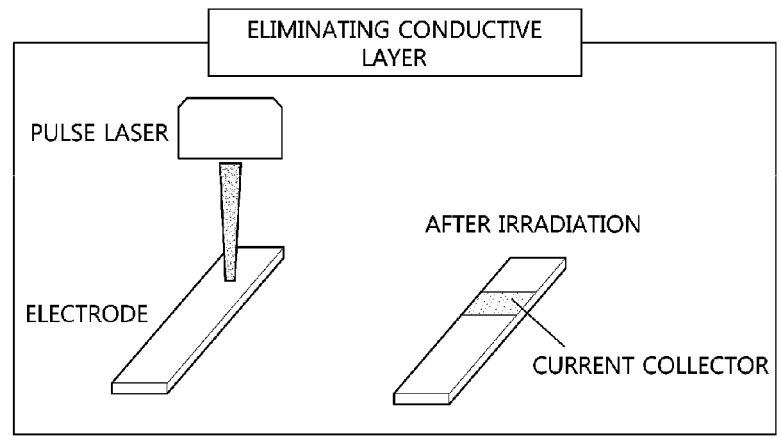
FIG. 2 illustrates the removal of a conductive layer in the welding process according to the present invention.
Figure 4:
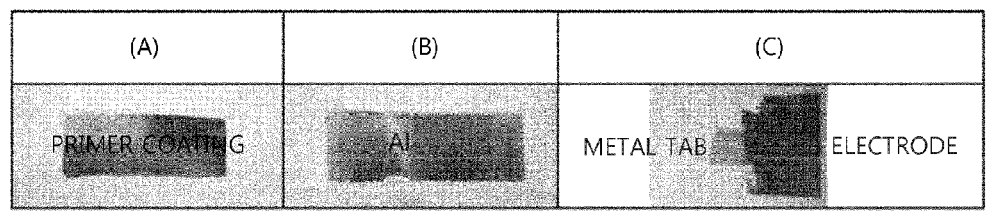
FIG. 4 is step-by-step photographs of the process of welding the electrode according to the present invention.

The electrode has a multilayer structure comprising a conductive layer and a polymer film layer. In the case where the conductive layer and the polymer film layer are formed of a polymer material, even when the electrode and the metal tab are welded using a conventional welding process, the weld quality may be poor. To solve this problem, a portion of the conductive layer in the multilayered structure of the electrode is irradiated with a pulse laser and is thus removed in a) of the welding method. In the present invention, the intensity of the pulse laser may be adjusted, and a wavelength that can be absorbed by the conductive layer and the electrode layer may be applied. Furthermore, any laser may be used without particular limitation so long as it may output a peak that facilitates the removal of the conductive layer and the welding of the metal tab. Specifically in a), in the electrode layer covered with the conductive layer and the polymer film layer as shown in FIG. 4(a), the conductive layer on the electrode is irradiated with a pulse laser as shown in FIG. 2, thus removing the conductive layer from the surface of the electrode layer corresponding to the position of welding the metal tab. Thereby, as shown in FIG. 4(b), the electrode, from which a portion of the conductive layer is removed, may be formed. The intensity of the pulse laser used in a) may be adjusted within an appropriate range, as necessary. Preferably, a 50 W pulse laser with an IR wavelength is applied at an average power density ranging from 1 M to 2 MW/cm², and more preferably from 1.3 M to 1.7 MW/cm².

As mentioned above, a portion of the conductive layer is removed, thus exposing the surface of the current collector positioned thereunder, corresponding to the position at which the metal tab is welded to the electrode layer. In b) of the welding method according to the present invention, the metal tab is placed and welded on the surface of the current collector.

The welding in b) may be performed by applying a pulse laser or ultrasonic waves.

Figure 3:
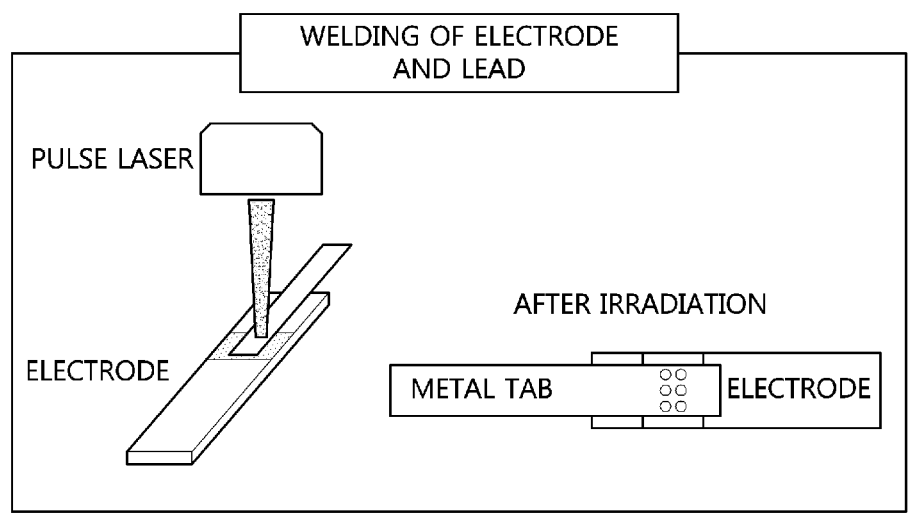
FIG. 3 illustrates the welding of a metal tab in the welding process according to the present invention.

Upon welding using a pulse laser, in the electrode (i.e. cathode) from which a portion of the conductive layer is removed, as shown in FIG. 4(b), the metal tab is placed on the surface of the current collector, which is exposed by removing the conductive layer, and is then irradiated with a pulse laser as shown in FIG. 3, whereby the electrode and the metal tab are welded. As illustrated in FIG. 4(c), the electrode for a cable-type secondary battery, in which the electrode (i.e. cathode) and the metal tab are welded, may be completed. The intensity of the pulse laser used in b) may be adjusted within an appropriate range, as necessary. Preferably, a 500 W pulse laser with an IR wavelength is applied at an average power density of 3 MW/cm² or more, and more preferably 3 M to 4 MW/cm².

The metal tab is not particularly limited, but is preferably formed of any one or more selected from the group consisting of stainless steel, aluminum, nickel, titanium, fired carbon, copper; stainless steel surface-treated with carbon, nickel, titanium or silver; and an aluminum-cadmium alloy, taking into consideration the price and the electrochemical stability of a metal for a current collector within the range of operation of batteries.

Additionally, upon welding using ultrasonic waves, the intensity of the ultrasonic waves may be appropriately adjusted, as necessary.

In addition, the present invention addresses an electrode for a cable battery, comprising a current collector for a cable battery, a conductive layer formed on the outer surface of the current collector, and a polymer film layer formed on the inner surface of the current collector, wherein a metal tab is welded on the surface of the current collector, from which a portion of the conductive layer is removed.

The electrode may be manufactured by the welding method according to the present invention.

In the electrode for a cable battery according to the present invention, the configuration of the current collector for a cable battery, the conductive layer, the polymer film layer and the metal tab remains the same as in the welding method described above.

In addition, the present invention addresses a cable-type secondary battery having a horizontal cross-section with a predetermined shape and extending in a longitudinal direction, comprising: a wire-type internal current collector having a first metal tab extending to a predetermined length at one end thereof; an inner electrode active material layer formed on the surface of the internal current collector; a separation layer formed on the outer surface of the inner electrode active material layer; and an outer electrode formed on the outer surface of the separation layer and including an outer electrode active material layer and a current collector having a second metal tab extending to a predetermined length at one end thereof, wherein the outer electrode is the electrode for a cable battery according to the present invention.

The cable-type secondary battery according to the present invention may be variously configured, and the configuration thereof is not particularly limited so long as it is typically useful in the art.

Although the embodiments of the present invention have been disclosed for illustrative purposes with reference to the drawings, those skilled in the art will appreciate that various modifications and substitutions are possible, without departing from the scope and spirit of the invention as disclosed in the accompanying claims.

The invention claimed is:

1. A method of welding a metal tab of an electrode layer for a cable battery, suitable for welding a metal tab to an electrode comprising a current collector for a cable battery, a conductive layer formed on an outer surface of the current collector, and a polymer film layer formed on an inner surface of the current collector, the method comprising:
   a) removing a portion of the conductive layer using a first pulse laser, thus exposing a surface of the current collector positioned thereunder; and
   b) welding a metal tab to the surface of the current collector using a second pulse,
   wherein in a), as the first pulse laser, a 50 W pulse laser with an IR wavelength is applied at an average power density ranging from 1 MW/cm² to 2 MW/cm².

2. The method of claim 1, wherein the current collector for a cable battery is a cathode for a cable battery or an anode for a cable battery.

3. The method of claim 1, wherein the current collector for a cable battery is a pipe-type current collector, a wound wire-type current collector, a wound sheet-type current collector, or a mesh current collector.

4. The method of claim 1, wherein the current collector for a cable battery is formed of stainless steel, aluminum, nickel, titanium, fired carbon, copper; stainless steel surface-treated with carbon, nickel, titanium or silver; an aluminum-cadmium alloy; a non-conductive polymer surface-treated with a conductive material; or a conductive polymer.

5. The method of claim 1, wherein the conductive layer comprises any one or more selected from the group consisting of polyacetylene, polyaniline, polypyrrole, polythiophene, polysulfur nitride, indium tin oxide (ITO), silver, palladium, and nickel.

6. The method of claim 1, wherein the polymer film layer comprises any one or more selected from the group consisting of a polyimide resin, a polyethylene terephthalate (PET) resin, and a polyethylene (PE) resin.

7. The method of claim 1, wherein the metal tab is formed of any one or more selected from the group consisting of stainless steel, aluminum, nickel, titanium, fired carbon, copper; stainless steel surface-treated with carbon, nickel, titanium or silver; and an aluminum-cadmium alloy.

8. The method of claim 1, wherein in a), as the first pulse laser, a 50 W pulse laser with an IR wavelength is applied at an average power density ranging from 1.3 MW/cm$^2$ to 1.7 MW/cm$^2$.

9. The method of claim 1, wherein in b), as the second pulse laser, a 500 W pulse laser with an IR wavelength is applied at an average power density of 3 MW/cm$^2$ or more.

10. The method of claim 1, wherein in b), as the second pulse laser, a 500 W pulse laser with an IR wavelength is applied at an average power density ranging from 3 MW/cm$^2$ to 4 MW/cm$^2$.

11. A method of welding a metal tab of an electrode layer for a cable battery, suitable for welding a metal tab to an electrode comprising a current collector for a cable battery, a conductive layer formed on an outer surface of the current collector, and a polymer film layer formed on an inner surface of the current collector, the method comprising:
   a) removing a portion of the conductive layer using a first pulse laser, thus exposing a surface of the current collector positioned thereunder; and
   b) welding a metal tab to the surface of the current collector using a second pulse laser,
   wherein in b), as the second pulse laser, a 500 W pulse laser with an IR wavelength is applied at an average power density of 3 MW/cm$^2$ or more.

* * * * *